Dec. 4, 1951 — H. BOOKMAN — 2,577,673
FRONT FENDER SKIRT
Filed Oct. 21, 1948 — 2 SHEETS—SHEET 1

HARRY BOOKMAN,
INVENTOR.

HUEBNER, BEEHLER,
WORREL, HERZIG, & CALDWELL,
ATTORNEYS.

BY Albert M Herzig

Dec. 4, 1951 H. BOOKMAN 2,577,673
FRONT FENDER SKIRT
Filed Oct. 21, 1948 2 SHEETS—SHEET 2
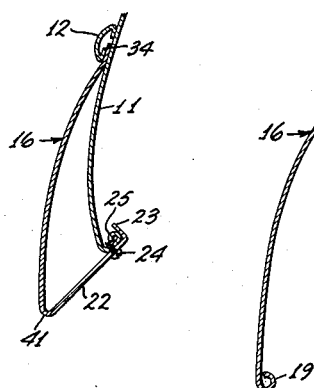
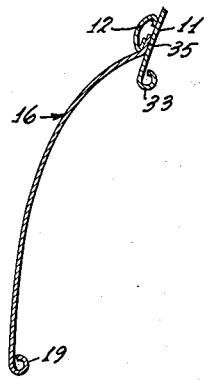
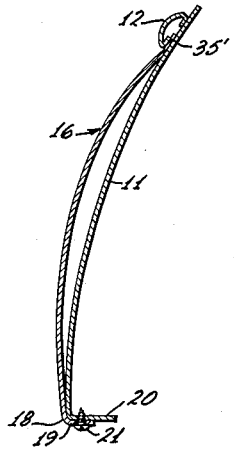
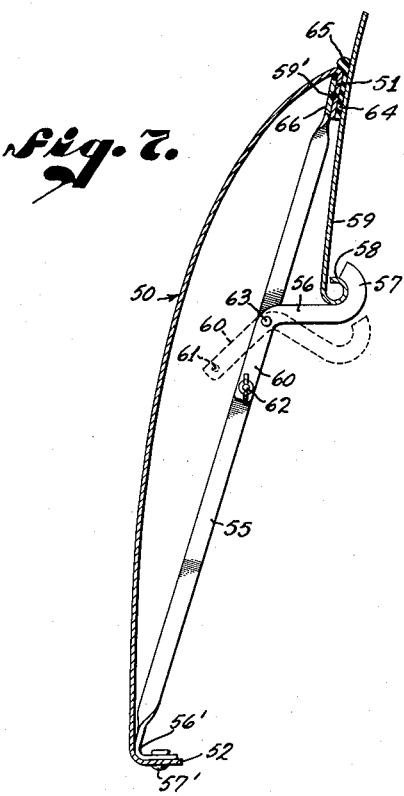
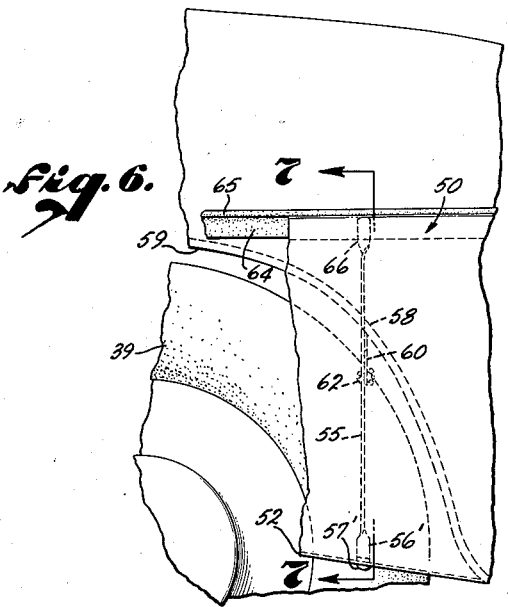
HARRY BOOKMAN,
INVENTOR.
HUEBNER, BEEHLER,
WORREL, HERZIG, & CALDWELL,
ATTORNEYS.

Patented Dec. 4, 1951

2,577,673

UNITED STATES PATENT OFFICE 2,577,673

FRONT FENDER SKIRT

Harry Bookman, Los Angeles, Calif.

Application October 21, 1948, Serial No. 55,692

1 Claim. (Cl. 280—153)

This invention relates to fender skirts for automobiles and particularly to a new and improved form of front fender skirt and new and improved means for securing the same to a fender.

Ordinarily the front fenders of automobiles have exposed wells to accommodate the turning of the front wheels. This open construction detracts from the streamline and appearance of the automobile which would be enhanced by the addition of appropriately designed front fender skirts whose application would beautify the front of the automobile and if properly constructed would harmonize with the remainder of the body without distorting the general proportions of the body and without requiring the front wheels to be set in from the sides of the car to a sufficient extent to be retained within the normal contours and proportions of the body.

Fender skirts, as previously known, have been mainly designed as a bare cover for the fender well and have not been so constructed and secured thereto as to add to the appearance and lines of the automobile. Neither has it heretofore been found feasible to attach the front fender skirt to the automobile without the necessity of drilling holes in the fender or otherwise marring the normal finish or appearance thereof.

It is therefore among the objects of this invention to provide a new and improved front fender skirt having a broad span permitting formation of ample curvatures for accommodating the front wheels of the automobile in their most turned angular position so as to streamline the fender at the well while harmonizing with and adding to the general body lines and design of the automobile.

Another object of this invention is to provide, in a front fender skirt of the desired character described, novel and improved attaching means complementary to conventional front fender structure and trim.

Another object of the invention is to provide new and improved means for attaching a front fender skirt to a front fender over the well thereof without permanently injuring the exterior appearance of said fenders in the event it is desired to dispense with these skirts, said attaching means being likewise readily releasable to facilitate removal of the skirt whereby to give access to the front wheels for changing a tire, removing the wheel, or the like.

Another object of the invention is the provision of a new and improved fender skirt which is rugged in construction, capable of ready application and removal, simple and sturdy in design, and susceptible of mass production.

It is moreover among the objects of this invention to provide improvements over prior art devices heretofore contemplated for generally similar purposes.

With these and other objects in view, the invention consists in the construction, arrangement and combination of the various parts of the device whereby the objects contemplated are attained, as hereinafter set forth, pointed out in the appended claim and illustrated in the accompanying drawings.

Referring to the drawings:

Figure 3 is a detailed sectional view as on a line 3—3 of Figure 2.

Figure 4 is a detailed sectional view as on a line 4—4 of Figure 2.

Figure 5 is a detailed sectional view as on a line 5—5 of Figure 2.

Figure 6 is a fragmentary side view of another preferred form of front fender skirt.

Figure 7 is an enlarged detailed sectional view as on a line 7—7 of Figure 6.

Figure 1:
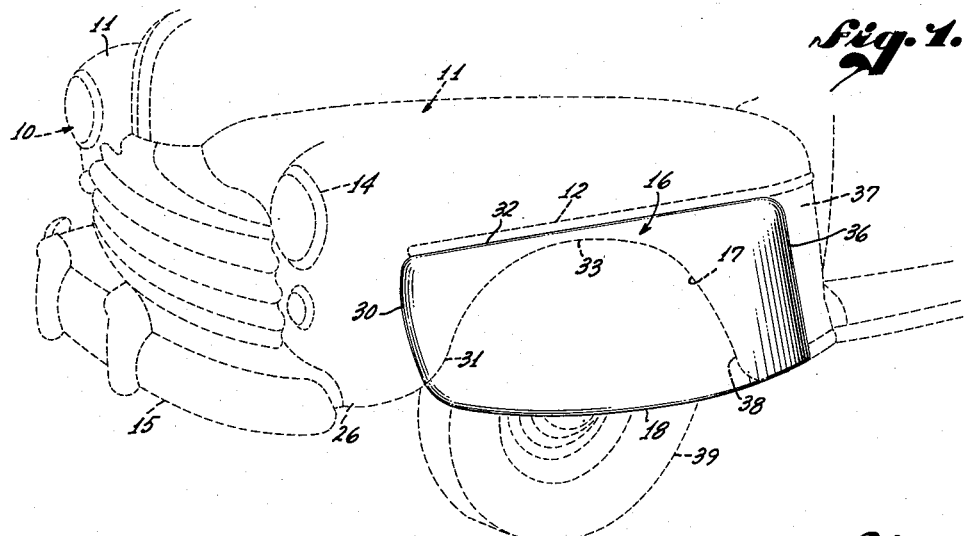
Figure 1 is a perspective view of an automobile, fragmentally shown in dotted outline, of a preferred form of front fender skirt as applied.

Referring more particularly to the drawings, there is shown an automobile 10 having a front fender 11 and a chrome strip 12 secured as at selected points 13 in a conventional manner to the fender. The automobile 10 chosen as exemplifying, but not limiting, this invention is a 1948 model Ford having integral headlights 14 formed in the fenders and having a front bumper 15.

A front fender skirt 16 is normally disposed over each fender well 17 as shown.

A bottom edge 18 of the skirt is preferably formed with an inturned lip 19 in alignment with the lower edge 20 of the fender 11 and through which any appropriate securing means as a sheet-metal screw 21 may be inserted to steady and hold the skirt at said point.

An elongate flange 22 is turned upwardly and inwardly and may also be provided with a stiffening lip or flange 23. A sheet-metal screw 24 may be inserted at the bottom edge of the fender adjacent a bead 25 shown in Figure 3 to be below the front fender panel 26 and normally extending entirely around the fender well opening 17.

The front edge 30 of the skirt extends considerably forward of the corresponding front edge 31 of the well 17. The upper edge 32 of the skirt preferably extends to a somewhat lesser degree above the upper central portion 33 of the well and may be provided as with flat parallel vertically projecting ears 34, 35 and 35', normally tucked under the chrome strip 12 between the points 13 of the securement to the fenders in order to hold the skirt to the fender at the top edge 32.

The rearward edge 36 of the skirt, in a similar manner to the forward edge 30, preferably also projects substantially over the rearmost handle 37 of the fender, thereby giving the skirt a considerable length from the forward edge 30 to the rearward edge 36 as compared with the corresponding distance between the forward edge 31 and rear edge 38 of the fender well 17, and giving the skirt a sufficient length to flare outwardly in a broad sweeping curve in conformity with and enhancing the streamline and contour of the automobile while at the same time providing sufficient clearance for turning of the front wheel 39.

As illustrated, the skirt 16 is roughly a parallelogram in shape whose upper and lower edges 19 and 32 taper slightly towards one another at the forward end 30, while the ends 30 and 36 preferably slant downward and rearwardly as shown, the edge 36 preferably slanting rearwardly more than the edge 30 and preferably having a tab 40 at the lowermost edge thereof normally lying flat against the outer side of the fender under a strip 40'.

The radius of curvature of the skirt at the juncture of the edges 30 and 32, and 32 and 36, and also optionally at the juncture of the bottom edge 41 and front edge 30, is preferably rather small as compared with the broader curvature of the skirt body proper viewed from any edge.

The instant construction provides securement at the curved corners 42, 43 and 44 of the skirt, at or about the tab 40 and by virtue of the ears 34, 35 and 35', preferably immediately above the well, thereby assuring adequate securement of the skirt to the fender. The fender, moreover, presents a streamlined appearance which tends, while the automobile is in motion, to diminish the wind forces, generally acting to tear the skirt loose from the fender. The relatively sharp curvature at the edges stiffens them and prevents flapping.

Figure 2:
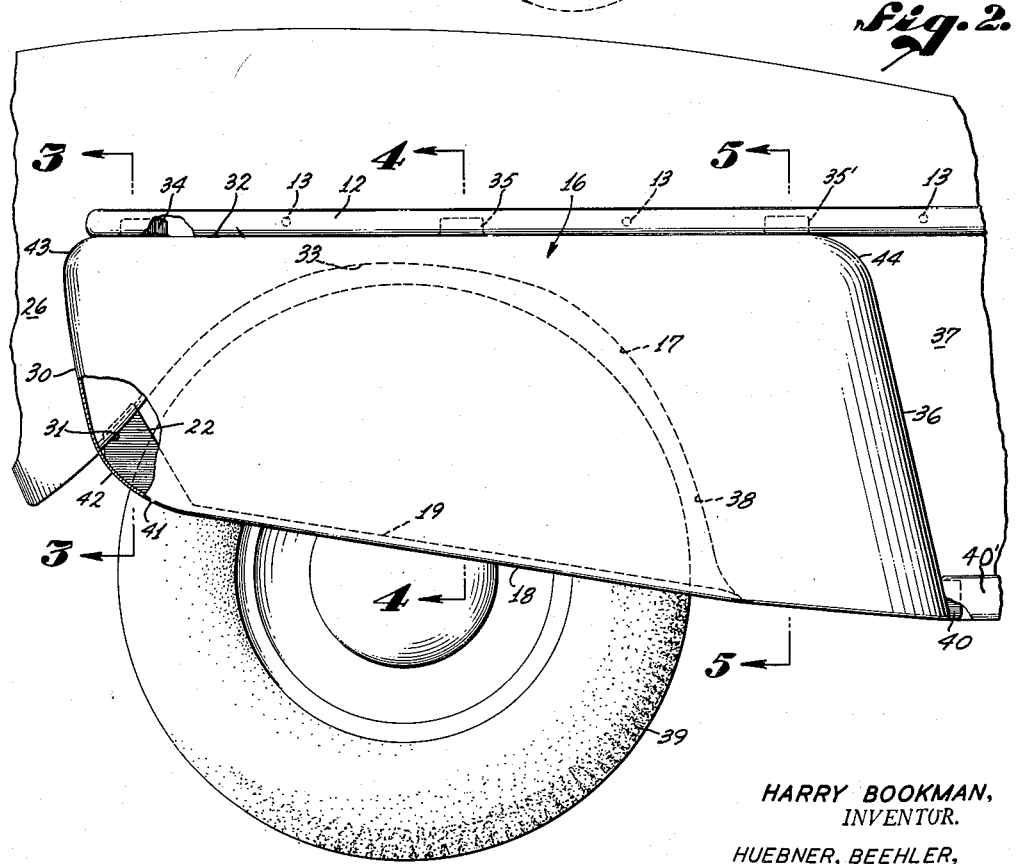
Figure 2 is an enlarged side view of the preferred form of front fender skirt as applied to an automobile with parts broken away.

The embodiment of Figures 6 and 7 discloses a front fender skirt 50 preferably formed as with a downwardly turned flange 51 at its upper edge and an inwardly turned flange 52 at its lower edge. The periphery may be formed in a similar manner to that illustrated for the first embodiment of Figures 1 through 5. A substantially vertical brace 55 may be secured at one of its ends 56' in any appropriate manner as by a rivet 57' to the bottom flange 52 of the skirt while the upper end 66 may likewise be twisted and secured in any appropriate manner as by spot welding 59' to the flange 51. The frame 55 thereby serves to strengthen the skirt and retain the bowed shape thereof from top to bottom edges.

Secured to the frame 55 is a link 56 having a hook-shaped arm 57 conforming to the shape of a bead 58 surrounding the well of a fender 59 (lacking the chrome strip 12 of the preceding embodiment) and another arm 60, also shown in dotted outline, formed with a hole 61 for the reception of a bolt or the like 62 to hold the hook in clamped relationship with the fender and firmly thereagainst. The link 56 is pivotally secured to the frame 55 as by means of a pin 63.

The non-abrasive felt strip 64 or the like, preferably formed with an ornamental and positioning bead 65, should be normally disposed between the flange 51 and the adjacent fender 59.

It is intended that the second embodiment may be applied to automobiles, particularly those lacking in a chrome trim strip 12, by placing the skirt in a desired position with its bottom flanges firmly under and against the bottom edge of the fender, then turning the arm 60 from its dotted position, as shown in Figure 7, to the solid position shown therein and passing the bolt 62 through the opening 61, then firmly tightening the same in place. In view of the extent to which the tip of the hook 57 encircles the bead 58, no other or further securement is ordinarily required, but firm securement is obtained. In connection with the extending ears 34, 35 and 35' of Figures 2, 3, 4 and 5, it may be said that the brace 55 may be employed upon this embodiment, in which case the securement means of Figures 5 and 6 serve to clamp the fender skirt laterally against the automobile while the extending ears 35 and 35' tend to prevent relative slippage rotation for lateral play of the skirt and the fender.

In other respects the two forms of skirt, except for the optional omission of the ears 34, 35 and 35', may be identical, when such additional brace is provided.

This invention features the provision of a front fender skirt considerably longer forwardly and rearwardly than the fender well, and which incorporates new and improved fastening means appropriate to the automobile to which it is to be applied, and optionally incorporating easily applied and releasable yet adequate securing means therefor.

The skirt may, of course, be made of metal, such as aluminum, sheet iron, or the like.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claim so as to embrace any and all equivalent devices.

Having described my invention, what I claim as new and desire to secure by Letters Patent is:

For use on a finished automobile front fender having an arcuate fender well at the side thereof open at the bottom and defining depending forward and rearward fender panels, a front fender skirt applicable to the outer side of said fender extending over the central fender body above the well, said skirt extending over said forward and rearward panels farther than over said central fender body, and means releasably securing said skirt to said fender above the well and over said forward and rearward fender panels, said means comprising a downwardly turned flange on an upper margin of said skirt, a stiffening lip on the bottom edge thereof, an elongate brace member having an end secured between the flange and the skirt body at said margin, another end of the brace member being secured to said opposite edge of the skirt, a clamp element comprising a link defining opposed arms pivotally secured to the brace member between the ends of the latter, said fender at said well defining a bead, one of said arms being hook-shaped to accommodate and grip said bead, holding means associated with the other arm and said brace member to retain the same in said gripping relationship to the bead whereby said skirt is firmly pressed against said fender, and a non-abrasive tape normally held between the flange and the fender to prevent marring of the latter.

HARRY BOOKMAN.

REFERENCES CITED

The following references are of record in the file of this patent:

UNITED STATES PATENTS

| Number | Name | Date |
|---|---|---|
| 2,158,813 | Altmyer | May 16, 1939 |
| 2,161,160 | Harroun et al. | June 6, 1939 |
| 2,261,376 | Jandus | Nov. 4, 1941 |
| 2,349,421 | Green | May 23, 1944 |